United States Patent [19]

Sano

[11] 4,275,128
[45] Jun. 23, 1981

[54] COVER APPARATUS FOR MONOBLOCK STORAGE BATTERY

[75] Inventor: Ichiro Sano, Yokohama, Japan

[73] Assignee: Furukawa Denchi Kabushiki Kaisha, Yokohama, Japan

[21] Appl. No.: 110,382

[22] Filed: Jan. 7, 1980

[30] Foreign Application Priority Data

Jan. 20, 1979 [JP] Japan ................................ 54/4466

[51] Int. Cl.³ ............................................. H01M 2/12
[52] U.S. Cl. ..................................................... 429/88
[58] Field of Search ........................ 429/82, 87, 88, 89

[56] References Cited
U.S. PATENT DOCUMENTS

| | | | |
|---|---|---|---|
| 3,879,227 | 4/1975 | Hennen | 429/88 |
| 4,117,205 | 9/1978 | Kitai | 429/88 |
| 4,186,247 | 1/1980 | Mocas | 429/89 |

*Primary Examiner*—Donald L. Walton
*Attorney, Agent, or Firm*—Haseltine and Lake

[57] ABSTRACT

A cover apparatus for a monoblock storage battery in which a case-shaped cover plate is provided on its reverse surface with a common exhaust passage which is formed between mutually facing walls and is covered with a covering wall and also with baffle walls so disposed outside respective ventilation openings made in the facing wall or walls as to leave respective gaps therebetween, and the respective gaps are covered with a covering wall for obstructing gas generated in cell chambers from flowing directly into the common exhaust passage.

1 Claim, 5 Drawing Figures

FIG. 2
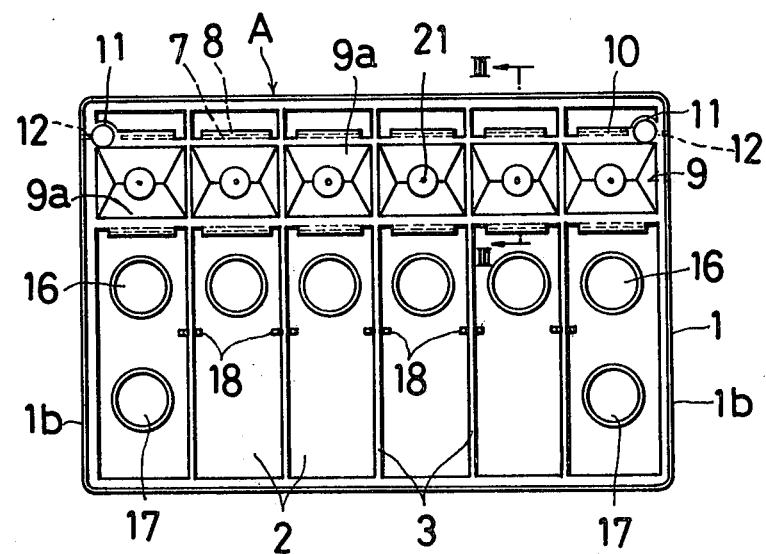
FIG. 3
FIG. 4
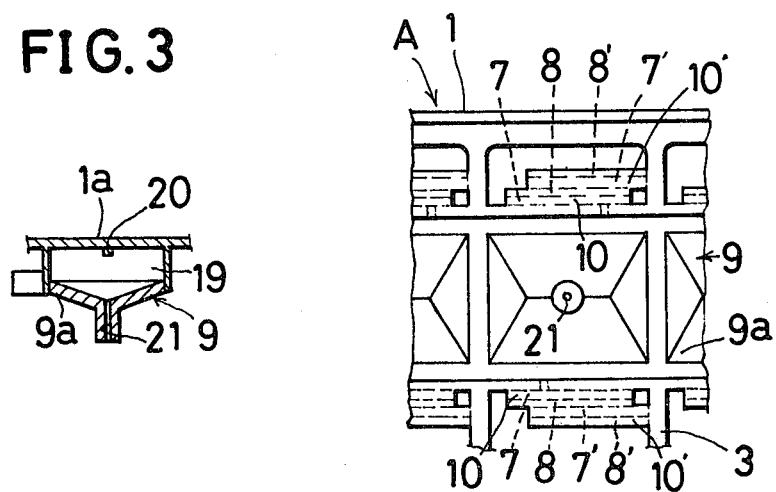

10

COVER APPARATUS FOR MONOBLOCK STORAGE BATTERY

FIELD OF THE INVENTION

This invention relates to a cover apparatus for a monoblock storage battery of the type that has an exhaust passage common to internal plural cell chambers.

PRIOR ART

A conventional battery cover apparatus of this kind is so constructed that a top wall of a cover is provided with openings for communicating the respective cell chambers to the exterior, and a channel-shaped exhaust passage is provided on the outer surface thereof, so that it has the disadvantage that there often is an electrolyte leakage phenomenon on the outer surface of the cover. To overcome this, the applicant has previously proposed a cover apparatus provided on its reverse surface with mutually facing walls extending across plural cell chambers, so that there is formed therein an exhaust passage common to the respective cell chambers. In this proposed cover apparatus, it is so constructed, as disclosed in Japanese unexamined publication No. 144747/Showa 52 (1977), that respective openings which are so made in the facing walls as to be in communication with the respective cell chambers remain open at their outside lower surfaces, so that it has the disadvantage that, in the case where the cover is applied to a battery container and is in use as a battery, gas containing electrolyte mists rising from the respective cell chambers in the battery container is discharged immediately through the respective openings, and thus a decrease in the amount of electrolyte in the cells results comparatively easily and in a short period of time.

SUMMARY OF THE INVENTION

An object of the invention is to provide a cover apparatus for a monoblock storage battery without the foregoing disadvantage, and which prevents the electrolyte from loss as a result of electrolyte mists as much as possible, and the mist-catching function is improved. It is characterized in that a case-shaped cover plate 1 is provided on its reverse surface with mutually facing walls 4, 4 extending across cell partition walls 3 partitioning the interior of the cover plate 1 into plural cell chambers 2, and at least one of the facing walls 4, 4 is provided with ventilation openings 5 corresponding to the respective cell chambers 2, so that a space between the facing walls 4, 4 is formed into a common exhaust passage 6 which is in communication with the respective cell chambers 2 through the respective ventilation openings 5, and baffle walls 8 are so provided outside the respective openings 5 as to leave respective gaps 7 therebetween, and there is provided a covering wall 9 which covers the lower surface of the common exhaust passage 6 and a covering wall 10 which covers the lower surfaces of the respective gaps 7.

It is of course understood that the covering walls 9 and 10 may be formed of a single integral cover plate or of separate individual cover plates.

Another object of this invention is to provide a method of manufacturing which facilitates the manufacturing of the foregoing cover apparatus, and it is characterized in that there is prepared a molded cover A comprising a case-shaped cover plate 1, plural cell partition walls 3 provided on the reverse surface of the cover plate 1 for partitioning the interior thereof into plural cell chambers 2, facing walls 4, 4 extending across these partition walls 3, ventilation openings 5 made in at least one of the facing walls 4, 4 and corresponding to the respective cell chambers 2, a common exhaust passage 6 which is formed in a space between the facing walls 4, 4 and is in communication with the respective cell chambers 2 through the respective openings 5, and baffle walls 8 so provided outside the respective openings 5 as to leave respective gaps 7 therebetween, and a molded covering plate 9 which is prepared separately and is common to the respective cell chambers 2 is mounted in the common exhaust passage 6, and thereafter, by means of a heating plate, the peripheral edge 9a of the molded covering plate 9 and the peripheral edge of the common exhaust passage 6 are fused together by heating to adhere together in a liquid-tight joint, and at the same time the lower edge of the facing wall 4 and the lower edge of the respective baffle walls 8 on the outside thereof are fused together by heating for forming a covering wall 10 on the lower surfaces of the respective gaps 7.

If this invention method is carried out by making use of a heating plate which is used in an ordinary case of heating fusion adhesion of a cover apparatus to a battery container, this is advantageous in that a monoblock storage battery with this invention cover apparatus can be obtained immediately after the manufacturing of this cover apparatus.

BRIEF DESCRIPTION OF THE SEVERAL VIEWS OF THE DRAWING

FIG. 2 is a reverse side of a product thereof, FIG. 3 is a sectional view taken along the line III—III in FIG. 2 and FIG. 4 is a reverse side view of a portion of another embodying example thereof.

DETAILED DESCRIPTION

Figure 1A:
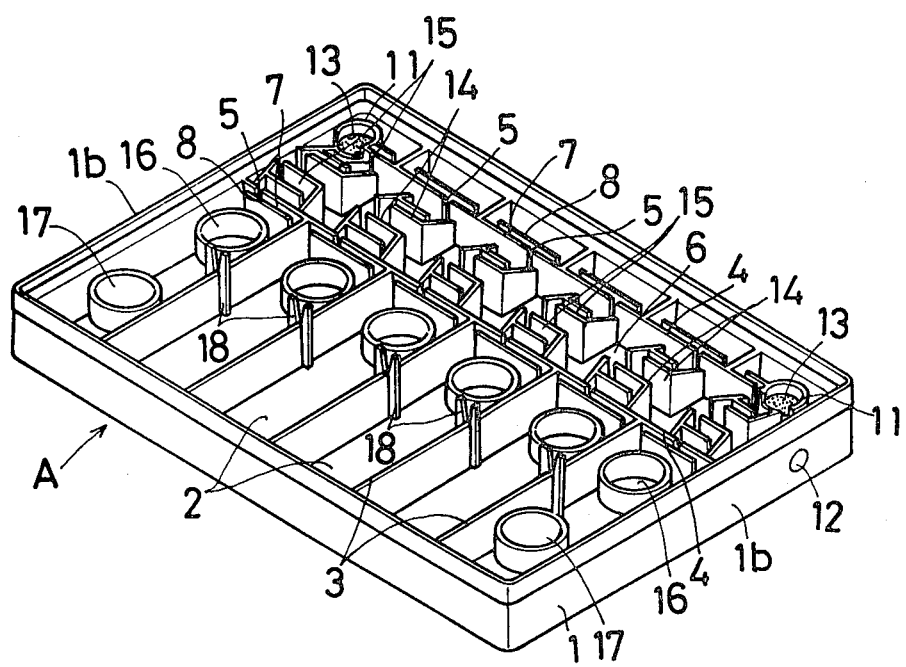
FIG. 1A and 1B are exploded perspective views of one embodying example of this invention.

The most preferable embodying example of this invention apparatus and that of this invention manufacturing process will be explained with reference to the accompanying drawings:

Referring to FIG. 1A, A denotes a molded cover of thermo-plastic synthetic resin such as polypropylene or the like, and the molded cover A has a case-shaped cover plate 1 formed of a cover top wall 1a and a rectangular peripheral side wall 1b extending downwards from the periphery thereof, plural parallel cell partition walls 3, 3 projecting from the reverse surface of the cover plate 1 for partitioning its interior hollow space into plural cell chambers 2, 2 . . . , and mutually facing walls 4, 4 extending across these partition walls 3, 3 . . . for defining therein an exhaust passage 6, and the respective facing walls 4, 4 are provided with respective slit-shaped ventilation openings 5, 5 corresponding to the respective cell chambers 2, and additionally the respective facing walls are so provided outside the respective openings 5 with respective baffle walls 8 as to leave respective gaps 7 therebetween. Thus, the exhaust passage 6 is made in communication with the respective cell chambers 2 through the respective ventilation openings 5, and accordingly the same is formed into the exhaust passage common to these cell chambers 2, 2 . . .

Additionally, the illustrated molded cover A is provided on its reverse surface with tubular walls 11, 11 formed by swelling outwards one of the facing walls 4, 4 at both ends of the exhaust passage 6, and the tubular walls 11, 11 are made in communication at their side walls with the external air through small vent openings 12, 12 made through both side portions of the side wall 1b of the cover plate 1. The tubular walls 11, 11 are stuffed with respective gas filters 13, 13. Additionally, a pair of baffle wall groups 14, 14, each comprising a large number of baffle walls bent lengthwise and crosswise are provided in the exhaust passage 6 on the reverse surface of the molded cover A so as to be positioned to face each pair of opposite ventilation openings 5, 5 for each cell chamber 2, and thus there are formed therein each pair of detour turning or twisting passages 15, 15 for gas.

Referring to the drawings, numeral 16 denotes a liquid filling opening made in the top wall 1a so as to correspond to each cell chamber 2, and numeral 17 denotes an electrode post inserting opening made through each of both end/cell chambers, and numeral 18 denotes a pair of projections for guiding battery container partition walls.

Figure 1B:
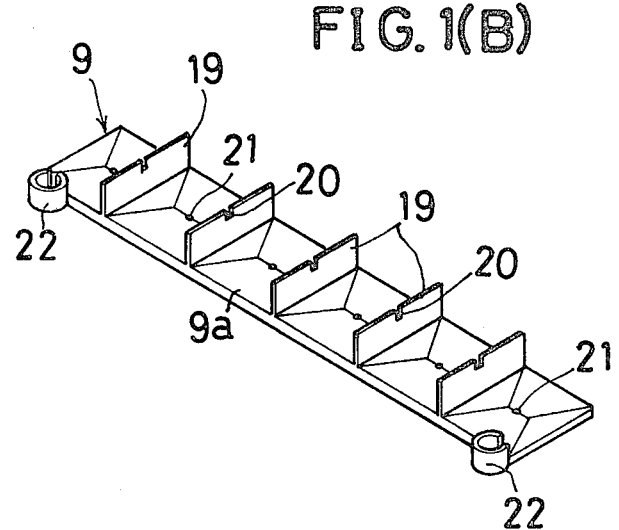

FIG. 1B shows a molded covering wall 9 of thermoplastic synthetic resin such as polypropylene or the like which is to be fitly mounted in the exhaust passage 6 so as to be in contact with the internal surfaces of the facing walls 4, 4 for covering the lower surface of the exhaust passage 6 of the foregoing molded cover A, and the reverse surface thereof is provided, at positions in alignment with the respective cell partition walls 3, with plural projecting walls 19 which are to be in abutment, at the time of the foregoing mounting, with the reverse surface of the cover top wall 1a and can serve to ensure that the outer surface of the covering wall 9 is positioned at the same height horizontal plane as the respective cell partition walls 3 and also can serve as baffle walls within the exhaust passage. The respective abutment end edges of the respective projecting walls 19 are provided with small cutout openings 20 for gas ventilation. Additionally, the covering wall 9 may be provided, at positions corresponding to the respective cell chambers 2, with respective electrolyte return flow holes 21, and the covering wall portion surrounding each hole 21 is formed into a funnel shaped inclined wall 9a centering on the return flow hole 21. Further, tubular projecting walls 22, 22 which are to be mounted so as to fit in the tubular walls 11, 11 at the time of mounting of the covering wall 9 in the common passage 6, are so formed, by molding, as to project from one side of the covering wall 9, so that the gas filters 13, 13 in the tubular walls 11, 11 can be supported from below by those walls at the time of being mounted in the tubular walls.

After assembling the covering wall 9 with the cover A in such a manner that the covering wall 9 is mounted in the exhaust passage 6 on the reverse surface of the cover A so as to cover the lower surface thereof the resultant cover apparatus is to be applied fixedly and in a liquid-tight manner to a battery container (not illustrated) for producing a liquid-tight mono-block battery by a common process, that is, by using a heating plate for fusing and thereafter pressing to form a liquid-tight joint.

It is highly efficient and is preferable, according to this invention in manufacturing this invention cover apparatus and a battery having the same to carry out by utilizing such a conventional foregoing heat sealing process, a liquid-tight fixing operation of the covering wall 9 to the cover A and a forming operation of the covering wall 10 for covering the lower surface of the respective gaps 7. Namely, by using the heating plate, such portions of the cover A that are to be in abutment with the upper surface of the battery container, that is, the peripheral edge portion and the respective partition walls 3 thereof are fused by heating by the known process. At that time, it is as a matter of course that such transversal portions of the covering wall 9 that are in alignment with the respective partition walls 3 are also fused by heating. According to this invention method, in addition thereto, by means of the heating plate, the peripheral edge 9a of the covering wall 9, the facing walls 4, 4 (including the tubular walls 11, 11) surrounding the peripheral edge 9a and every pair of the baffle walls 8, 8 disposed on both outsides of the facing walls 4, 4 are fused, by heating, whereby, as shown in FIG. 2 the covering wall 9 is connected in liquid-tight manner to the surrounding portion thereof and at the same time there is formed the covering wall 10 which extends therebetween for closing the lower surface of the slit-shaped ventilation openings 5 and the lower surface of the gaps 7. It is of course clear that at least one facing wall 4 and baffle wall 8 opposite thereto are previously formed into one having a height or thickness enough to form by fusion the covering wall 10. It is usual and is preferable that after completion of the foregoing work by the heating plate, the resultant cover apparatus is immediately brought into pressure contact with the battery container to obtain the monoblock battery having this invention cover apparatus.

According to the cover apparatus of this invention, in the use thereof, the covering wall 10 obstructs the gas generated in each cell chamber of the battery container from going directly to the slit-shaped opening 5, so that the gas is required to go around the covering wall 10 and, without fail, flow through the gap 7 from both ends of the covering wall 10 into the exhaust passage 6 and consequently during the travel of the gas the electrolyte mists in the gas can be removed effectively, and additionally the gas introduced from the slit opening 5 collides against the baffle wall group 14 and thereafter is discharged from the small vent openings 12, 12 on both ends, after passing through the gas filters 13, 13 on both ends and during this travel the gas undergoes again the liquid mists removing action. The liquid mists thus caught by the baffle groups are returned to the interior of each cell chamber 2 through each return flow opening 21 of the covering wall 9. On this occasion, each projecting wall 19 of the covering wall 9 can serve as a partition wall for returning the liquid mists discharged from each cell chamber 2 to the same cell chamber as much as possible. The return flow opening 21 is so small in diameter that a film of the returning liquid can be produced therein to close the same so as to prevent the gas from entering the same from the outside. It can be considered that, as shown in FIG. 4, at least one additional baffle wall 8' is provided so as to leave at least one additional gap 7' between the same and the baffle wall 8 and at least one additional covering wall 10' is provided on the lower surface of the gap 7', whereby the mist catching function can be further improved.

Thus, according to this invention, there are provided on the reverse surface of the battery cover, in addition to the provision of the covering wall which covers the lower surface of the exhaust passage common to the respective cell chambers, baffle walls so as to leave respective gaps between the same and the outside of the respective ventilation openings made in at least one of the facing walls forming the exhaust passage therebetween and the covering wall which covers the gaps is provided, so that the removal effect of the electrolyte mists contained in the gas generated in the battery can be improved. Additionally, according to this invention, the connection fixture of the covering wall for covering the common exhaust passage and the formation of the covering wall for covering the gaps are carried out by fusion, by heat, of the facing wall or walls and the baffle walls by using a heating plate, so that the cover apparatus can be manufactured by utilizing the conventional process of the heat fusion connection between a cover and a battery container and thus the manufacturing thereof can be facilitated and the manufacturing efficiency thereof can be improved.

What is claimed is:

1. A cover apparatus for a monoblock storage battery comprising a case-shaped cover plate; cell partition walls partitioning the interior of the cover plate into plural cell chambers; mutually facing walls on the reverse surface of the cover plate and extending across said cell partition walls, at least one of the facing walls being provided with ventilation openings corresponding to the respective cell chambers, so that a space between the facing walls is formed into a common exhaust passage which is in communication with the respective cell chambers through the respective ventilation openings; baffle walls provided outside the respective ventilation openings so as to leave respective gaps therebetween; a covering wall covering the lower surface of the common exhaust passage; and a covering wall covering the lower surfaces of the respective gaps.

* * * * *